Sept. 20, 1938.  L. MILNER  2,130,647
SPIRIT LEVEL
Filed March 30, 1937
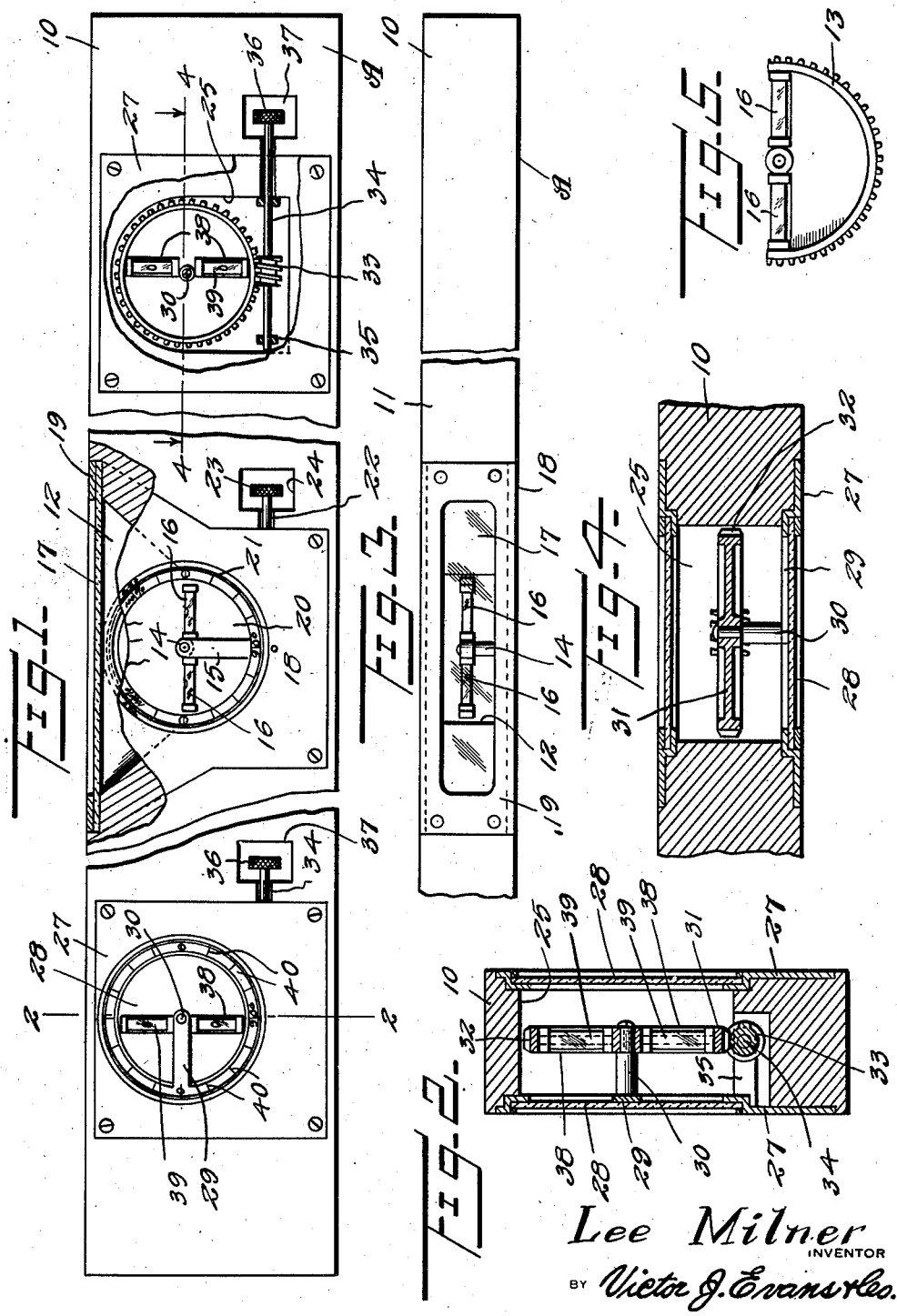
Lee Milner
INVENTOR
BY Victor J. Evans & Co.
ATTORNEY Patented Sept. 20, 1938

2,130,647

UNITED STATES PATENT OFFICE 2,130,647

SPIRIT LEVEL

Lee Milner, Portsmouth, Va.

Application March 30, 1937, Serial No. 133,877

2 Claims. (Cl. 33—213)

The invention relates to a level and more especially to an adjustable spirit level and plumb.

The primary object of the invention is the provision of an instrument of this character, wherein the arm, blade or beam of such instrument has arranged therein spirit tubes, these being adjustably supported so as to enable the accurate determination of level, grade, drop and plumb findings, the instrument being universally readable for level and plumb findings as well as drops, particularly the pitch of a roof or other structure.

Another object of the invention is the provision of a level of this character, wherein the construction thereof is novel in form and the bubble tubes or spirit barrels can be regulated or adjusted with ease and dispatch, these being readable from opposite sides of the blade or beam of the instrument and also at one straight edge thereof thus rendering the instrument convenient and handy for uses applicable thereto.

A further object of the invention is the provision of a level of this character, which is simple in construction, thoroughly reliable and efficient in its operation, easy of reading, quick of adjustment, strong, durable, and inexpensive to manufacture.

With these and other objects in view, the invention consists in the features of construction, combination and arrangement of parts as will be hereinafter more fully described, illustrated in the accompanying drawing, which discloses the preferred embodiment of the invention and pointed out in the claims hereunto appended.

In the accompanying drawing:

Figure 1 is a fragmentary side elevation partly in section of a level constructed in accordance with the invention.

Figure 2 is a sectional view on the line 2—2 of Figure 1.

Figure 3 is a fragmentary top edge view.

Figure 4 is a fragmentary sectional view on the line 4—4 of Figure 1 looking in the direction of the arrows.

Figure 5 is an elevation of the spirit or bubble level tubes.

Similar reference characters indicate corresponding parts throughout the several views in the drawing.

Referring to the drawing in detail, A designates generally the level and plumb involving a blade, arm or beam 10 having opening through one straight longer edge at 11, preferably centrally with respect thereto, a suitable well or pocket 12 for accommodating a substantially half circular shaped gear 13 supported on an axle 14 fitted to a bearing 15. This gear 13 carries bubble or spirit level tubes 16, these being arranged in the same plane with each other at the flat side of the half circular gear 13 and are visible through a glass panel or window 17 seated and held at the edge 11 of the arm, blade or beam 10 and covering the pocket or well 12. The bearing is cut from a side 18 of a fitting 19 on the said arm, blade or beam. This bearing extends to the center of a circular lens 20 having peripherally thereof graduations, degree or scale markings 21 for determining the adjustment of such tubes 16 in the use of the instrument as a level or plumb.

Geared with the half gear 13 is a turning stem 22 provided with a knurled knob 23 exposed through a clearance 24 therefor provided in the arm, blade or beam 10. By hand operation of the knob 23 manual adjustment of the bubble or spirit level tubes 16 in unity may be had and the reading of these being discerned at the window or panel 17 during the use of the instrument as a level or plumb.

Near opposite ends of the arm, blade or beam 10 and opening through opposite sides thereof are openings 25 while counterseated in opposite faces of the arm, blade or beam concentrically about each opening 25 are ring fittings 26, these carrying cover glasses 28 for the opening 25. Formed on the reverse sides with respect to the arm, blade or beam 10 and with one of the ring fittings 27 in each of the respective openings 25 is a bearing 29 which extends to the center of said opening and carries an axle 30 upon which is journaled a circular gear 31. This gear has peripherally thereof worm gear teeth 32 meshing with a worm screw pinion 33 fixed to a turning stem 34 suitably journaled at 35 within the opening 25. This stem 34 is provided with a knurled knob 36 exposed within a clearance 37 provided in the arm, blade or beam 10 for the manual turning of the stem 34 and the driving of the gear 31.

The gear 31 has formed therein at opposite sides of its turning axis or the axle 30 slots 38, these being aligned with each other at the transverse center of said gear and have held therein bubble or spirit tubes 39 which are visible through the glasses 28 at either side of the said arm, blade or beam 10.

These glasses 28 marginally of the same and with respect to the gear 31, respectively, have provided thereon circular scales, degree marks or graduation marks 40 with which coact the tubes 39 in the lay of the same for determining the extent of adjustment of the gears 31 when the instrument is in use as a plumb, the scale reading of adjustment under plumb use of the instrument being had from either side of the arm, blade or beam.

The spirit tubes in their mountings are readily removable from the arm, blade or beam in case of breakage so that renewals of defective parts may be had with dispatch.

The tubes are of a construction so that the bubbles may be readily visible from both sides and the uppermost edge of the arm, blade or beam for a reading at almost any angle.

The entire instrument can be made so that it will not be affected by climatic conditions.

The instrument under adjustability of the bubble or spirit tubes assures accuracy in the use thereof and permits of increased usefulness of the instrument and the reading of the same from many angles.

What is claimed is:

1. In an instrument of the character described, a straight edged blade having a well opening through opposite sides and one longer edge of the same, transparent panels covering the well at the sides and the said longer edge of the blade, a rotary element within the well, and a pair of spirit level tubes carried by said element, being in longitudinal alignment with each other and rendering visible a single bubble at both sides of the axis of rotation of said element through said transparent panels.

2. In an instrument of the character described, a straight edged blade having a well opening through opposite sides and one longer edge of the same, transparent panels covering the well at the sides and the said longer edge of the blade, a rotary element within the well, a pair of spirit level tubes carried by said element, being in longitudinal alignment with each other and rendering visible a single bubble at both sides of the axis of rotation of said element through said transparent panels, and means confined within the blade for imparting rotation to the said element.

LEE MILNER.